INVENTOR
ROBERT J. WHITE
BY W H Hooper
ATTORNEY

INVENTOR
ROBERT J. WHITE
BY W H Hooper
ATTORNEY

United States Patent Office

Re. 26,358
Reissued Mar. 5, 1968

26,358

SINGLE-STAGE HYDROCRACKING PROCESS WITH A NITROGEN CONTAINING FEED STOCK

Robert J. White, Pinole, Calif., assignor to Chevron Research Company, a corporation of Delaware Original No. 3,248,318, dated Apr. 26, 1966, Ser. No. 294,374, July 11, 1963. Application for reissue July 1, 1966, Ser. No. 569,765
11 Claims. (Cl. 208—111)

Figure 1:
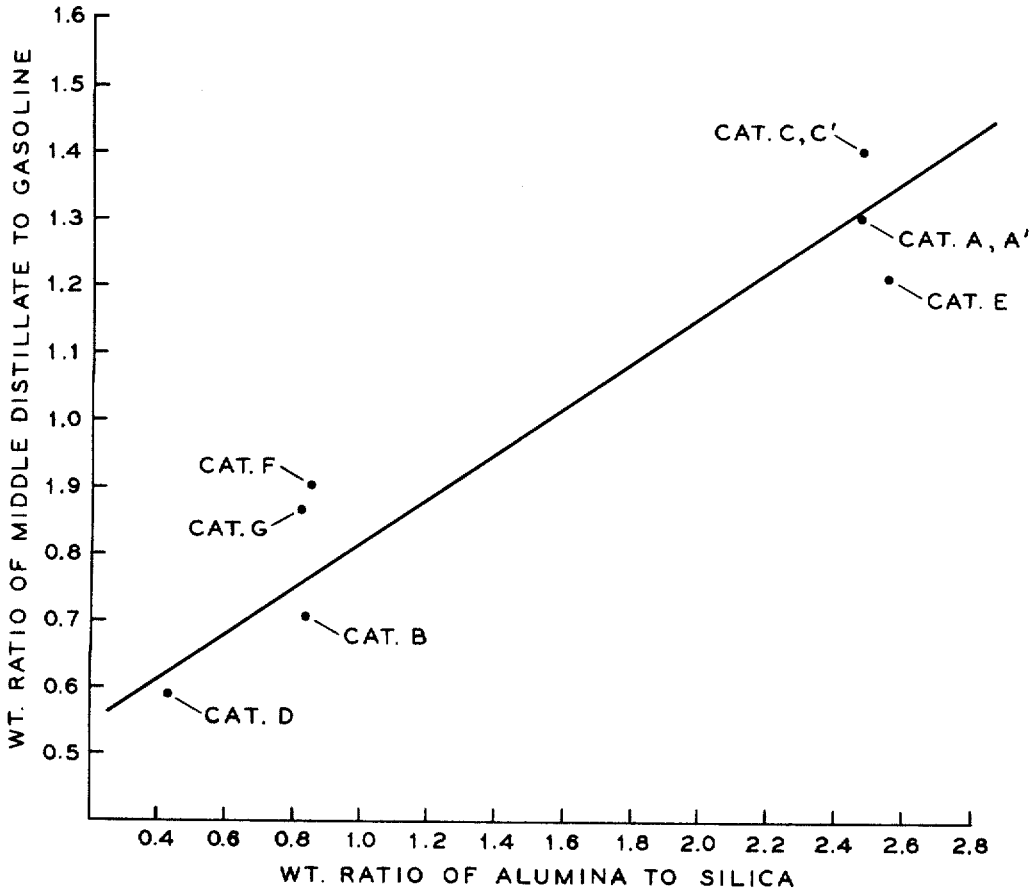

Matter enclosed in heavy brackets [ ] appears in the original patent but forms no part of this reissue specification; matter printed in italics indicates the additions made by reissue.

This invention relates to a hydrocracking process, and more particularly, to an improved hydrocracking process utilizing hydrocracking catalysts having greater flexibility in producing wide ranges of products and also characterized by their relative insensitivity to feed components heretofore considered deleterious to hydrocracking catalysts.

Hydrocracking is a reaction wherein mixtures of hydrocarbons are converted to lower boiling products in the presence of added hydrogen and a catalyst at elevated temperatures and pressures. The major line of commercial development that has occurred in the hydrocracking field has been the employment of certain catalysts comprising acidic supports, e.g., silica-alumina composites, having at least one hydrogenating-dehydrogenating component impregnated thereon. However, this commercial development has been largely based on the finding that naturally occurring petroleum constitutents, particularly nitrogen-containing components, adversely affect the catalyst and that if these undesirable components are removed from the feed to the hydrocracking zone, as by hydrofining, low operating temperatures and pressures and relatively long catalyst on-stream life are realized with the proper catalyst. Although this process has been a very desirable step forward in the petroleum refining industry and is an excellent process in that it is characterized by high yields of liquid products with low coke and light gas production, it still almost always requires a two-stage operation, i.e. hydrofining of the feed to remove nitrogenous compounds, followed by hydrocracking of the relatively nitrogen-free hydrofined product. Therefore, at least two different reaction zones, with at least two different types of catalysts, are generally required. This two-stage process has been fully described in U.S. Patent No. 2,944,006 (Scott), issued July 5, 1960.

It has now been found that hydrocracking processes can be improved even further by the utilization of specific nitrogen-insensitive hydrocracking catalysts herein described. These catalysts allow the following desirable results to be attained.

(1) The primary feed denitrification step, e.g., hydrofining, can now be completely eliminated resulting in a single-stage reaction system. By "a single-stage reaction system" is meant that straight run or cracked distillates, deasphalted crude oils or even crude oils themselves, containing large amounts of nitrogen and/or sulfur compounds can be directly fed into the hydrocracking reaction zone without previous removal of these compounds that have heretofore been considered catalyst deactivators. Although the physical hydrocracking reaction zone can be actually contained in a plurality of vessels, the term "single-stage," as herein employed, means either one or more hydrocracking reaction vessels operating under essentially the same reaction conditions with the same catalyst. The advantage of such an improvement is readily apparent in that the elimination of a denitrification step considerably reduces equipment and catalyst costs.

(2) The hydrocracking catalyst of the present invention also provide a ready means for the operator of the hydrocracker to tailor his hydrocracked products to suit his particular needs merely by regulating the respective concentrations of the components of the catalyst. Thus, the catalyst can be made to maximize total synthetic products, or to maximize the production of gasoline, with the attendant minimizing of middle distillates (kerosene, jet fuels, diesel fuels, etc.) or, by only varying the concentrations of the same components of the catalyst, maximum middle distillate production can be had. It must be emphasized that this product flexibility can be attained by only varying the concentration of the same components of the catalysts, and that the process conditions of temperature and pressure need not be appreciably altered for any different product distribution desired. This is of tremendous advantage in the design and construction of the unit, since the reactor, etc. need meet only one pressure-temperature specification.

(3) Furthermore, although rather broad ranges of reaction temperatures and pressures can be advantageously employed, it has been found that the catalyst fouling rate, i.e., the rate of catalyst deactivation due to catalyst poisons and/or coke laydown on the catalyst surface, is dependent to a surprising extent upon reaction pressures, and if the latter are maintained within a certain preferred range, extremely low catalyst fouling rates, with attendant long on-stream periods without catalyst regenerations, can be attained. Such a result is desirable since it allows more continuous operation and less plant down-time and loss of production.

The present invention is directed to a process for the hydrocracking of hydrocarbon-containing feed stocks boiling above about 400° F. to produce at least one product fraction boiling below the initial boiling point of the feed stock. This process comprises contacting the feed stock, along with added hydrogen, in a hydrocracking zone at a temperature of from about 650° to about 950° F., a pressure of from about 800 to about 3000 p.s.i.g., and a L.H.S.V. (liquid hourly space velocity) of from about 0.1 to about 10.0, with a catalyst comprising at least one Group VI metal sulfide within a silica-alumina gel. It is essential that the catalyst be manufactured by the steps comprising the following:

(a) Forming a mixture comprising a silica sol, at least one soluble aluminum compound, and at least one soluble compound of at least one Group VI metal.

(b) Reacting the mixture formed in step (a) with a quantity of an epoxy compound sufficient to convert the mixture into a hydrogel.

(c) Dehydrating the hydrogel formed in step (b) to produce a gel comprising silica, alumina and at least one Group VI metal oxide.

(d) Thereafter converting the Group VI metal oxide to its corresponding sulfide by contact with a sulfur-containing fluid.

As herein employed, the term "hydrogel" is defined as a solid material containing both the solid phase of a colloidal solution and the imbibed liquid phase. A "gel" is produced by dehydration, generally by heating, of a hydrogel. In this text, the term "gel" generically includes both xerogels and aerogels.

As is apparent from the above discussion, the major advantages of the subject hydrocracking processes are attained by the employment of the specific catalyst described in the present invention. The method of manufacturing this catalyst is therefore an essential feature of the process.

The manufacture of the subject catalyst is done in a series of stages. The operation involves forming an initial mixture comprising a silica sol, at least one soluble aluminum compound, and at least one soluble compound of at least one Group VI metal. All of these components must be in the mixture since it is necessary that the catalyst of the present process be produced by simultaneous cogelation, as will be more fully described below. Thus, it is not within the scope of the present invention to produce a catalyst by, for example, producing a gel by cogelling only two of the components, e.g., the silicon and aluminum constituents, and thereafter disposing the Group VI metal onto the two-component gel by conventional impregnation or sublimation techniques. Although additional metals can be impregnated or otherwise disposed upon the gel produced by the present process if desired, it is required that the subject catalyst be composed of silica-alumina and a Group VI metal compound that have been simultaneously cogelled to produce a hydrolysis system (hydrogel), dehydrating the latter to form the gel containing silica, alumina and the Group VI metal oxide, and thereafter converting the latter to its corresponding sulfide.

A major reason for the simultaneous cogelling of the components in the initial mixture is that it has been found that such catalysts are very much superior to three-component catalysts produced by other methods, such as by impregnating the Group VI metal on a coprecipitated or cogelled silica-alumina support.

It has been found that the catalysts prepared according to the method disclosed herein will possess higher catalyst activities, lower fouling rates and better selectivities than catalysts of the same composition prepared by other methods. The reason for this superiority is not completely understood but it is believed that the microscopic and uniform dispersion of the components, and/or compound formation, that probably exists throughout the catalyst, leads to the improved results. Because of this fine, uniform dispersion, the gel produced by the preparation disclosed herein can be termed a "microgel." It further appears that the generally undesirable tendency of metals and their compounds to form relatively large metal crystallites on the surface of the catalyst is considerably less than with catalysts prepared by other means.

Returning again to the mixture comprising a silica sol, a soluble aluminum compound and at least one compound of at least one Group VI metal, the silica sol can be made by any conventional procedure. A number of methods for producing such a sol are known to those skilled in the art. Thus, silica sols can be made by hydrolyzing tetraethyl orthosilicate with an aqueous HCl solution, either in the presence or absence of solvents, such as alcohols containing from 1 to 4 carbon atoms per molecule, acetone, methyl ethyl ketone and the like. Likewise, silica sols can be prepared by contacting silicon tetrachloride with a cold methanol and water solution, or with 95% ethyl alcohol, or with cold water or ice. Also, silica sols can be made by contacting sodium silicate with an ion exchange resin to remove the sodium, or by contact with an acid and thereafter removing sodium by ion exchange. Preferably, alkali metals and alkaline earth metals are avoided in manufacturing the silica sol because such metals have often been found to adversely affect the activity of the finished hydrocracking catalyst. The particular method of making the silica sol will be related to the specific aluminum compound and Group VI metal compound admixed with the silica sol due to the necessity of both the aluminum and Group VI metal compounds being soluble in the silica sol. Suitable aluminum and Group VI metal compounds that can be employed in forming the initial mixture are, for example, nitrates, sulfates, formates, oxylates, and acetates. However, it is preferred to use halides and oxyhalides. As herein defined, alumina sols are considered to be generically covered by the term "soluble aluminum compounds." Therefore, if desired, the aluminum component of the catalyst can be derived from the use of an alumina sol in the initial mixture of the silica sol and soluble Group VI metal compound.

The actual order of mixing the components in the initial mixture is not critical. The silica sol can be first formed with subsequent addition of the aluminum and Group VI metal compounds. Or, the silica sol can be formed as the last step by adding the silicon compound to a mixture containing all of the other components.

Because it is important to have a homogeneous sol containing all of the necessary components, it is very desirable to have a solvent present that:

(a) will keep the metal compounds in solution in the sol;

(b) will keep the epoxy compound in solution in the sol.

Such a solvent should be one that is more polar than the epoxy compound, for example, an organic solvent such as a lower alcohol, or water; if a sufficient amount of water is present, it will act as the necessary solvent. If only water is relied upon as the solvent, it is preferable that ethylene oxide be employed as the epoxy compound rather than a higher oxirane such as propylene oxide, inasmuch as the solubility of the ethylene oxide is higher in water than higher alkylene oxides. The higher solubility increases the likelihood that the desired epoxy compound concentration in the silica sol can be obtained. However, the presence of an organic solvent in addition to the presence of water is most preferred. Such a solvent may be an organic solvent meeting the aforesaid criteria, for example, a lower alkanol such as methanol, ethanol, or propanol, acetone, methyl ethyl ketone, dimethyl formamide, or mixtures thereof. Methyl and ethyl alcohols are most preferred because of their high polarity.

Wide ranges of varying concentrations of the silica, alumina and Group VI metal components of the subject catalyst are operable in the subject hydrocracking process. Concentrations of these components are, of course, dependent upon the concentrations of the silica sol, aluminum compound, and Group VI metal compound in the initial mixture. Concentrations of these components are adjusted in the mixture such that the catalyst produced therefrom will have a silica content of from about 3 to 97 weight percent, an alumina content of from about 2 to 96 weight percent, and a Group VI metal content of from about 1 to 35 weight percent. Preferably the initial mixture concentration is adjusted such that the catalyst will have a composition of from about 25 to 75 weight percent alumina, from about 2 to 20 weight percent of the Group VI metal and the remainder silica. Even more preferred, the reduced catalyst should contain 40 to 70 weight percent alumina, from 4 to 20 weight percent of the Group VI metal with the remainder again being silica. The reasons for the preferred concentration ranges are shown in the examples below.

As noted, the catalyst of the present process must contain one or more sulfides of a Group VI metal, i.e., chromium, molybdenum, or tungsten. It can also contain other hydrogenation-dehydrogenation components such as the metals or compounds of the Group VIII metals, particularly nickel, cobalt, platinum, palladium and rhodium. Also, if it is desired, such metals as vanadium and manganese can be included. Soluble compounds of these compounds can be added to the initial mixture, thereby being cogelled along with the silicon, aluminum and Group VI compounds, or they can be impregnated upon the catalyst after preparation of the multicomponent gel. Also, if desired, the initial mixture can contain soluble compounds of zirconium, magnesium, titanium, thorium, and the like. These latter compounds will then be converted to their corresponding oxides in the finished catalyst. Such components can alter the isomerization activity of the catalyst, thereby allowing further flexibility in the hydrocracked product distribution.

The mixture of metal compounds is reacted with a quantity of an epoxy compound. The actual order of forming the mixture and the addition of the epoxide is not important so long as a homogeneous mixture of the epoxide and all of the metal compounds is formed before the metal components set into a hydrogel. Thus, for example, the epoxy compound can be added to only one of the metal compounds, and the other metal compounds and/or silica sol can be added to this so long as this latter addition is done before the reaction between the epoxide and the first metal compound results in a single component hydrogel.

Preferred epoxides are oxiranes containing from 2 to 3 carbon atoms per molecule and include ethylene oxide, propylene oxide and epichlorohydrin. The amount of epoxide reacted can be expressed in the mol ratio of the epoxy compound to the number of reactive groups present in the mixture. This ratio should be from about 0.5 to 7.0, or more, and preferably from about 1.0 to 5.0.

Following the addition of the epoxy compound, the resulting mixture will set into a hydrogel after a period of from a few seconds to several hours depending upon the concentration of the components, the temperature, and the particular solvent or combination of solvents employed. This hydrogel can be dried by conventional methods, such as by evaporation of the solvents. This dried gel will still contain about 30 weight percent water. This is then further dehydrated to convert substantially all of the components to their corresponding oxides. For example, this dehydration can be accomplished by heating from about 700° to about 1000° F. under atmospheric pressure. Other dehydrating methods are known to those familiar to catalyst manufacturing techniques. This dehydration operation, which is hereby defined as the conversion of the hydrogel to a gel whose components are essentially in the oxide form, producing a gel having a high surface area, generally lying in the range of from about 300 to 600 $m.^2/g.$ (square meters per gram).

The Group VI metal oxide component of the dehydrated gel can be converted to the metal sulfide by any well known procedure. The Group VI metal can be contacted with a sulfur containing fluid, such as hydrogen sulfied or a hydrogen and low molecular weight mercaptan or organic sulfide, at temperature preferably below about 750° F. so as to convert at least a substantial portion of the Group VI metal to its corresponding sulfide. Sulfiding can be done by contact with a mixture of hydrogen and sulfur containing fluid (including sulfur-containing feedstocks) at temperatures in the range of from about 500 to 900° F. When a Group VIII metal is incorporated within the catalyst, it is preferred to reduce the Group VIII metal oxide present in the gel before sulfiding. This reduction step can be done by conventional techniques as, for example, by contacting the gel with hydrogen at a temperature of from about 600° to 900° F.

The feedstocks suitable for use in the hydrocracking process of the present invention should boil in the range of from about 400° to 1400° F. or more, and, preferably, in the range of from about 600° to 1200° F. Since the present process can hydrocrack nitrogen and/or sulfur containing feeds, such feedstocks as straight-run or cracked distillates (including cycle oils and gas oils), deasphalted heavy petroleum fractions, topped crudes, shale or tar sand oils, are all suitable. Although nitrogen-free fractions are easily converted by the process with excellent results, so too are those nitrogen-containing stocks that have heretofore been required to be hydrofined prior to hydrocracking.

The hydrocracking process is conducted at temperatures of from about 650° to 950° F., and, preferably from about 700° to 850° F. Suitable pressures are from about 800 to 3000 p.s.i.g. or more, but the preferred range is from about 1200 to 2000 p.s.i.g. Liquid hourly space velocities (L.H.S.V.) of from 0.1 to 10 are quite suitable. The reaction is also conducted in the presence of added hydrogen, the amount being at least 500 s.c.f. (standard cubic feet), and normally 750 to 2000, per barrel of feed. Pure hydrogen or hydrogen-light-hydrocarbon mixtures, such as those recovered from catalytic reformers, are quite suitable for use in the present process.

The process is well adapted to be carried out using any type feed-catalyst contacting method. Thus, such methods as fixed-bed, moving bed, slurry, or fluid catalyst systems can be employed by procedures well known in the art. The latter three systems would allow an operator to change product distribution without shutting down the unit, since catalyst bleed streams could remove the initial catalyst, which produces a particular product distribution, and replacing it with catalyst that produces an entirely different product distribution. However, the preferred method is that employing at least one fixed catalyst bed.

In the examples to follow, reference will be made to conversion, catalyst activity, starting temperature, fouling rates (FR), and middle distillate to gasoline ratios. As herein used, these terms can be defined as follows.

Conversion is the weight percent of the feedstock converted within the catalytic reaction zone to synthetic products, i.e., products boiling below the initial boiling point of the feedstock.

Catalyst activity is the relative ability of the particular catalyst to convert (hydrocrack) the feed to synthetic products. This catalytic activity can be measured in a number of ways but, for purposes of this disclosure, two methods have been employed. The first, herein termed the "constant conditions method," involves the conversion, in weight percent, of a particular test feed to products boiling below 650° F. after an eight-hour run under constant reaction conditions, i.e., temperature (800° F.), pressure (1200 p.s.i.g.), space rate in L.H.S.V. (liquid hourly space velocity), (L.H.S.V. of 2) and hydrogen rate (6000 s.c.f. (standard cubic feet) of hydrogen per barrel of feed). The degree of conversion is the measure of catalyst activity. The test feed employed in all of the catalyst activity determinations using the constant conditions method is described in Table 1.

TABLE 1

| | |
|---|---|
| Type [1] | |
| Gravity, ° API | 25.4 |
| Analine pt., ° F. | 176.5 |
| Total nitrogen, p.p.m. | 600 |
| Total sulfur, wt. percent | 2.3 |

[1] Straight-run Arabian Gas Oil.

| | |
|---|---|
| Boiling range, ° F. (by ASTM D-1160): | |
| Start | 622 |
| 10% | 699 |
| 30% | 715 |
| 50% | 749 |
| 70% | 802 |
| 90% | 887 |
| End point | 994 |

Another method of measuring catalyst activity, herein termed the "constant conversion method," is based upon the fact that activity can be related to the reaction temperature (starting temperature) at which a set conversion value is attained. Thus a particular test feed, defined with respect to boiling point and the like, is hydrocracked at a particular conversion level, e.g., 50 weight percent, or some other selected conversion. In order to attain this predetermined conversion for any particular catalyst, all reaction conditions are kept constant except catalyst temperatures. It can be seen that the lower the starting temperature, i.e., the catalyst temperature at the start of the run that allows the catalyst to attain the set conversion level, the more active the catalyst. It is apparent that a catalyst that reaches, say, a 50 weight percent conversion with a starting temperature of 750° F., has a higher catalyst activity than does a catalyst which attains the same conversion at a starting temperature of 800° F. Thus, the lower the starting temperature, the higher the catalyst activity of the catalyst being tested.

The fouling rate of a catalyst, herein abbreviated to FR, is the rate at which a catalyst loses activity due to deactivation by feed components, as, for example, mitrogen-containing compounds, particularly molecular species of hydrocarbons, and the like. As a catalyst becomes deactivated, it is necessary to increase the reaction temperature to maintain the same conversion level. The adjustment necessary to be made upon reaction temperatures give rise to the determination of FR. It can be seen that the more rapid the rate at which reaction temperatures must be raised to maintain the set conversion, the more rapid the rate of undersirable catalyst fouling. It is desired to hydrocrack at the lowest possible temperature, since the advantages of long on-stream catalyst life, before regeneration of replacement of the catalyst is necessary, is apparent and of decided benefit. In short, the lower the fouling rate of a catalyst, the more desirable it is. The FR can be expressed in terms of temperature and time. Thus, a catalyst with an FR of 0.1° F. per hour means that the reaction (and catalyst) temperature must be increased 0.1° every hour in order to maintain the set conversion level. A catalyst with an FR of 0.05° F./hr. has only one-half the fouling rate. Since any given hydrocracking unit has a temperature limit, i.e., reaction temperatures cannot exceed the specification, it is obvious that a catalyst with one-half the FR of another catalyst can be used in the reactor twice as long before regeneration or replacement.

Reference will be made herein to middie distillate to gasoline ratio (MD/Gaso). This is defined as the weight ratio of essentially synthetic middle distillate produced by hydrocracking, this distillate having a true boiling point range of from 400° to 650° F., to the synthetic gasoline produced, the gasoline fraction including all hydrocarbons having 5 or more carbon atoms per molecule and boiling below 400° F. Thus, the gasoline fraction can be shown as a $C_5$ to 400° F. cut.

As has been pointed out above, the composition of the catalyst can be regulated so that radical differences in reaction product distribution are attained. It has been found that this result is had by regulating the weight ratios of the silicon and aluminum components in the initial mixture, and thus the ratio of silica and alumina in the final catalyst. In general, the higher the weight ratio of alumina to silica, the greater will be the middle distillate to gasoline produced ratio under essentially the same reaction conditions. This effect is shown in the following examples.

Example 1

Catalyst A was produced by forming a solution comprising 724.2 grams of $AlCl_3 \cdot 6H_2O$ and 60.3 grams of $MoCl_5$ dissolved in 9000 ml. of methyl alcohol. To this solution was added 208.1 grams of $SiO_4(C_2H_5)_4$. Some silica sol was formed with this addition. The silica sol formation was then completed by the addition of 1200 ml. of water accompanied by stirring. The mixture, comprising the silica sol and solution, was cooled from 80° to 30° F. and 2400 ml. of propylene oxide was added. After one hour of gel time, a hydrogel was formed at a temperature of 65° F. The hydrogel was allowed to stand overnight and then dehydrated by oven drying at 250° F. for 24 hours, heating in air for 4 hours at 450° F. and thereafter heating in air (in a muffle furnace) at 1000° F. for 4 hours. The resulting gel (xerogel) was then contacted for one hour with flowing hydrogen at 800° F. and was then converted to the sulfide by contact with a mixture of hydrogen and $H_2S$ (1 to 1 mol ratio) for one hour at a temperature of 600° F.

The finished catalyst had a composition, in weight percent, of 13 percent $MoS_2$ (about 8 percent molybdenum), 62 percent $Al_2O_3$ and 25 percent $SiO_2$. The alumina to silica weight ratio was 2.48. The catalyst had a surface area of 462 m.²/g. Catalyst A was tested by the constant conditions method and had an activity, measured in conversion, of 54 percent.

Example 2

Catalyst A[1] was produced by dissolving 9.36 grams of molybdic acid (85 percent $MoO_3$) and 181 grams of $AlCl_3 \cdot 6H_2O$ in 2.25 liters of methyl alcohol containing 24 ml. of 37 percent HCl. To this was added 52 grams of $SiO_4(C_2H_5)_4$ and 300 ml. of $H_2O$. The resulting silica sol-containing mixture was then cooled to 55° F., and 500 ml. of propylene oxide added. The resulting hydrogel was then dehydrated to the gel and the molybdenum component sulfided in the manner described in Example 1. The resulting catalyst A[1] had the same composition and catalyst activity as catalyst A. Its surface area was 446 m.²/g.

Example 3

Catalyst B was made in the manner described in Example 1 except the amounts of the components were as follows:

| | |
|---|---|
| $AlCl_3 \cdot 6H_2O$, g. | 725 |
| $MoCl_5$, g. | 47.5 |
| $CH_3OH$, ml. | 3000 |
| $H_2O$, ml. | 650 |
| $SiO_4(C_2H_5)_4$, g. | 624 |
| Propylene oxide, ml. | 2000 |

After sulfiding, the catalyst had a composition, in weight percent, of 6.5 percent $MoS_2$, 43 percent alumina, and 50.5 percent silica. The alumina to silicate weight ratio was 0.85. The surface area was 556 m.²/g. and its constant conditions activity was 65 percent conversion.

Example 4

Catalyst C was produced exactly as described in Example 1, including the quantities of the components except 6.11 grams of $PdCl_2$ was also added to the initial solution. After sulfiding, the catalyst had a composition, in weight percent, of 13 percent $MoS_2$, 1.5 percent Pd, 61 percent $Al_2O_3$ and 24.5 percent $SiO_2$. The alumina to silica weight ratio was 2.49. The surface was 475 m.²/g. and the constant conditions activity was 56 percent conversion.

Catalyst C was then contacted with an Arabian straight-run gas oil, boiling from about 650° to 980° F. and containing about 600 p.p.m. total nitrogen and about 2 weight percent sulfur, and 6000 s.c.f. of hydrogen per barrel of feed for about 400 hours at a temperature varying from about 785° to 835° F. and at two pressures, namely 1200 p.s.i.g. and 1500 p.s.i.g. The reaction temperatures were adjusted within the noted range so as to provide a constant weight percent conversion of about 55 percent. The middie distillate to gasoline ratio of the products remained constant at 1.4. After the 400 hour on-stream period, catalyst C had fouled to a certain extent, this fouling indicated by the necessity of increasing the reaction temperature so as to maintain the 55 percent conversion.

Partially fouled catalyst C was then contacted, at 600 p.s.i.g., with a nitrogen-air mixture in the sequence of steps shown in Table 2.

TABLE 2

Regeneration procedure

| Temperature, ° F. | Oxygen conc., vol. percent | Hours contacted |
|---|---|---|
| 500 | 0.5 | 4 |
| 650 | 1.0 | 18 |
| 700 | 1.0 | 2 |
| 750 | 1.0 | 2 |
| 800 | 1.0 | 2 |
| 850 | 1.0 | 2 |
| 900 | 1.0 | 2 |
| 950 | 1.0 | 2 |
| 950 | 4.0 | 4 |

Regenerated catalyst C, herein termed catalyst $C^1$, was found to have the identical catalyst activity and produced the same middle distillate to gasoline ratio as catalyst C. The only differenence was that catalyst $C^1$ had a surface area of 368 m.²/g.

This example shows that the subject catalyst can be completely regenerated. However, regeneration can be done under much broader ranges and conditions than specifically exemplified. In general, regeneration can be accomplished by contacting the catalyst at subatmosphere, atmosphere and superatmosphere pressures at temperatures from about 500° F. to about 1100° F. with inert gases, such as nitrogen, flue gases, etc., containing relatively small amounts of oxygen. The initial contact of the fouled catalyst with the regenerating gas should be with a gas that has a relatively low oxygen content, e.g., from 0.5 to 2 percent, so as to prevent sintering of the catalyst by excessive burning temperatures. After most of the contaminants are removed from the catalyst, the oxygen concentration can be raised if desired.

Example 5

Catalyst D was made in the manner described in Example 1 except the components, and their quantities, were as follows:

| | |
|---|---|
| $AlCl_3 \cdot 6H_2O$, g. | 724.3 |
| $PdCl_2$, g. | 14.9 |
| $MoCl_5$, g. | 146.4 |
| $SiO_4(C_2H_5)_4$, g. | 1251.6 |
| $CH_3OH$, ml. | 6000 |
| $H_2O$, ml. | 1200 |
| Propylene oxide, ml. | 2460 |

After sulfiding, catalyst D had a composition, in weight percent, of 13 percent $MoS_2$, 1.5 percent Pd, 60 percent silica and 25.5 percent alumina. The alumina to silica ratio was 0.425. The surface area was 358 m.²/g. and its constant conditions activity was 44 percent conversion.

Example 6

Catalyst E was prepared in the manner of Example 1 except the components were as follows:

| | |
|---|---|
| $AlCl_3 \cdot 6H_2O$, g. | 724 |
| $MoCl_5$, g. | 60.3 |
| $NiCl_2 \cdot 6H_2O$, g. | 14.7 |
| $SiO_4(C_2H_5)_4$, g. | 208.1 |
| $CH_3OH$, ml. | 9000 |
| $H_2O$, ml. | 1200 |
| Propylene oxide, ml. | 2400 |

After sulfiding, catalyst E had a composition, in weight percent, of 13 percent $MoS_2$, 2.3 percent NiS, 61 percent alumina and 23.7 percent silica. The alumina to silica weight ratio was 2.56. The surface area was 459 m.²/g. and is constant conditions activity was 50 percent conversion.

Example 7

Catalyst F was produced in the same manner described in Example 1 except the components were as follows:

| | |
|---|---|
| $AlCl_3 \cdot 6H_2O$, g. | 726 |
| $NiCl_2 \cdot 6H_2O$, g. | 22.5 |
| $MoCl_5$, g. | 95.4 |
| $SiO_4(C_2H_5)_4$, g. | 624 |
| $CH_3OH$, ml. | 3000 |
| $H_2O$, ml. | 600 |
| Propylene oxide, ml. | 2250 |

After sulfiding, catalyst F had a composition, in weight percent, of 15 percent $MoS_2$, 2.3 NiS, 44.6 $SiO_2$ and 38.1 alumina. The weight ratio of alumina to silica was 0.86 The catalyst surface area was 359 m.²/g. and its constant conditions activity was 71 percent conversion.

Example 8

Catalyst G was produced according to the method disclosed in Example 1 except that the $WCl_6$ was dissolved in 1000 ml. of methyl alcohol and added to the mixture just prior to the addition of the epoxide, the final dehydration was done in a tube furnace with a low-oxygen containing gas, and the quantities of the components were as follows:

| | |
|---|---|
| $AlCl_3 \cdot 6H_2O$, g. | 725 |
| $NiCl_2 \cdot 6H_2O$, g. | 22.5 |
| $SCl_6$, g. | 74 |
| $SiO_4(C_2H_5)_4$, g. | 624 |
| $CH_3OH$, ml. | 2000 |
| $H_2O$, ml. | 600 |
| Propylene oxide, ml. | 1540 |

After sulfiding, catalyst G had a weight percent composition of 10.8 percent $WS_2$, 2.3 percent NiS, 39.1 percent alumina and 47 percent silica. The weight ratio of alumina to silica was 0.82. The catalyst had a surface area of 501 m.²/g. and a constant conditions activity of 79 percent conversion. This high activity is believed due, in part, to the use of a low oxygen (0.5 percent) content gas in the final dehydration step.

The middle distillate to gasoline weight ratio from the hydrocracked products from the constant conditions activity test at 50 percent conversion was determined for each separate catalyst. FIGURE 1 shows such ratios plotted against the alumina to silica weight ratio of catalysts A through G. The points on the figure identified as cat. A, etc., refer to the catalyst identified in the above examples. From FIGURE 1, it can be seen that the essential synthetic product distribution, reflected in the middle distillate to gasoline ratios, is a function of the alumina to silica ratio of the catalyst, and is relatively independent of the presence or absence of a Group VIII compound so long as the group VI metal sulfide is present. It is apparent then, that by varying the alumina to silica ratio, the desired product distribution can be attained without substantial changes in reaction conditions.

Figure 2:
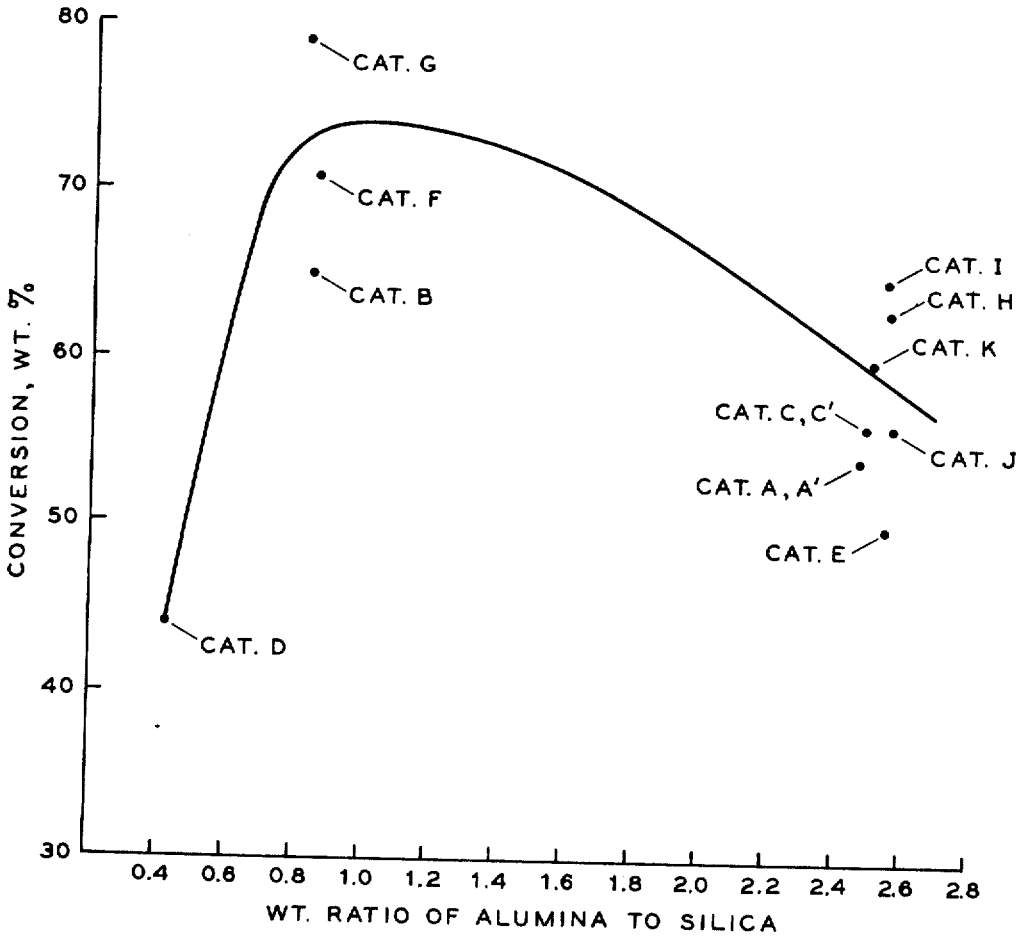

Another interesting effect of alumina to silica ratios is shown in FIGURE 2 wherein these ratios of catalysts A through G are plotted against the weight percent conversion determined by the constant conditions method described previously. From this figure, it can be seen that total conversion increases rapidly from relatively low alumina to silica ratios (0.4) to a peak in the range 0.8 to 1.0, and then decreases somewhat slowly to the point where the alumina content of the catalyst is high, i.e., alumina to silica ratio of about 2.5.

From the data summarized in FIGURES 1 and 2, it can be seen that the alumina to silica ratio within the catalyst determines the distribution of the hydrocracked products, and, further, affects the conversion.

The fouling rates and denitrification activities of several of the catalysts described in the above examples were determined by contacting the catalysts with straight-run gas oils very similar in nature under specific reaction conditions and conversion levels. Inspections of these typical test feeds are given in Table 3.

TABLE 3

| Feed | A | B | C | D |
|---|---|---|---|---|
| Gravity, ° API | 25.6 | 26.0 | 26.0 | 26.3 |
| Aniline point, ° F | 173.3 | 179.2 | 175.4 | 175.0 |
| Pour point, ° F | +80 | | | |
| Total nitrogen, p.p.m | 574 | 638-646 | 554 | 625 |
| Total sulfur, wt. percent | ~2 | 2.17 | 2.22 | 2.17 |
| Paraffins, vol. percent | | 33.4 | | |
| Naphthenes | | 45.6 | | |
| Aromatics | | 21.0 | | |
| Distillation, ASTM D-1160, ° F.: | | | | |
| Start/5% | 634/675 | 672/– | 648/688 | 608/679 |
| 10%/30% | 692/714 | 707/730 | 695/709 | 686/699 |
| 50% | 731 | 754 | 728 | 712 |
| 70%/90% | 779/852 | 800/893 | 763/856 | 737/834 |
| 95%/E.P | 877/957 | 929/989 | 908/998 | 891/984 |

Example 9

Catalyst C was contacted with Test Feed A at a starting temperature of about 785° F., an L.H.S.V. of 1.5, and a pressure of 1200 p.s.i.g. in the presence of 6000 s.c.f. of hydrogen per barrel of feed. Under these conditions, initial conversion was about 55 weight percent with a product middle distillate to gasoline ratio of 1.4. As the catalyst fouled, the reaction temperature was increased to maintain the conversion constant. After about 100 hours on-stream, the FR was 0.23° F./hr. and the total product, including both converted and unconverted feed, had a total nitrogen content of only 1.2 p.p.m. (down from 574 p.p.m.). When catalyst C had been on-stream for a total of about 165 hours, the FR was still 0.23° F./hr. and the total product nitrogen level was 3.2 p.p.m. The reaction temperature had been increased from 785° to about 825° F. The reaction conditions were then changed by cooling the catalyst to about 817° F. and increasing the presence to 1700 p.s.i.g. After about another 120 hours, the temperature had been raised only a degree or so, the FR being less than 0.01° F./hr. and the total product nitrogen level was only 1 p.p.m. The reaction pressure was then reduced to 1400 p.s.i.g. and after an on-stream period of about 115 additional hours, the FR was 0.06° F./hr. with the nitrogen level in the total feed varying from 4.7 p.p.m. at the beginning to 7.7 p.p.m. at the end of the run.

Catalyst C was then regenerated by the procedure described in Example 4. This regenerated catalyst, catalyst $C^1$, was then contacted with Test Feed A of Table 3 at a starting temperature of 785° F., an L.H.S.V. of 1.5, and a pressure of 1200 p.s.i.g. in the presence of 6000 s.c.f. of hydrogen per barrel of feed. Conversion was about 55 percent and this was maintained throughout the entire on-stream period. The product middle distillate to gasoline ratio was 1.4. After about 180 hours on-stream, the reaction temperature has been gradually increased to about 835° F., resulting in a FR of about 0.24° F./hr. The denitrification ability of catalyst $C^1$ was shown by the fact that, after about 80 hours on-stream, the total product nitrogen content was only 2.6 p.p.m. After 180 hours, the catalyst temperature was reduced to about 827° F. and the pressure increased to 1500 p.s.i.g. Under these conditions, the temperature had to be increased only about 2° F. in the next 200 hours in order to maintain the 55 percent conversion. This amounts to a FR of only 0.02° F./hr. At the start of this 200 hour run, the total product nitrogen level was 2.3 p.p.m. and was 5.4 p.p.m. at the end of this period.

Example 10

Catalyst D was contacted with Test Feed D of Table 3 at a starting temperature of 755° F., an L.H.S.V. of 0.8, and a pressure of 2000 p.s.i.g. in the presence of 6000 s.c.f. of hydrogen per barrel of feed. Conversion was 60 percent and after 60 hours on stream, the temperature was still 755° F. and 60 percent conversion, giving a fouling rate of zero. The temperature was then increased to 767° F. and the pressure reduced to 1500 p.s.i.g. After 60 more hours, at a constant 64 percent conversion, the temperature was still 767° F., giving a FR of zero. The temperature was then increased to 790° F., the pressure kept at 1500 p.s.i.g., and the space rate increased to an L.H.S.V. of 1.5. Conversion was 55 percent and was kept at that figure for the remaining on-stream period. After 200 more hours on stream, the reaction temperature had been increased to 797° F., thereby giving a FR of about 0.035° F./hr. The middle distillate to gasoline ratio of the products had remained constant throughout the entire 320 hours at about 0.7. In the last 200 hours, catalyst D had denitrified the feed so that the nitrogen level in the 650° F.+portion of the product had gone from 2.4 p.p.m. at the start to 4.0 p.p.m. at the end of the 200 hour on-stream period.

Example 11

Catalyst E was contacted with Test Feed B of Table 3 at a starting temperature of 770° F., a pressure of 1500 p.s.i.g., and an L.H.S.V. of 1.5 in the presence of 6000 s.c.f. of hydrogen per barrel of feed Under these conditions, conversion was about 52 weight percent. After about 285 hours on stream, at constant conversion, the reaction temperature had been increased to about 775° F., resulting in a FR of about 0.03° F./hr. After the first 80 hours, denitrification had resulted in a total product nitrogen level of only 0.13 p.p.m. The pressure was then reduced to 1200 p.s.i.g. and the temperature increased to about 784° F., these conditions giving rise to about 52 percent conversion. During the next 165 hours, the temperature was increased to 787° F., to maintain the same conversion. This amounted to a fouling rate of 0.03° F./hr. At the start of this last 165 hour run, the feed was denitrified to the extent that the total product nitrogen content was only 0.21 p.p.m. and this increased to 1.0 p.p.m. at the end of the 165 hour on-stream period. The reaction temperature was then increased to about 795° F., all other conditions being kept the same, this temperature increase giving rise to an increase of conversion to about 58 weight percent. After about another 174 hours on stream, the reaction temperature had been increased to about 825° F., thereby increasing the FR to 0.21° F./hr.

Example 12

Catalyst F was contacted with Test Feed C of Table 3 at a starting temperature of about 758° F., a total pressure of 1600 p.s.i.g., and an L.H.S.V. of 1.5 in the presence of 6000 s.c.f of hydrogen per barrel of feed Under these conditions, a conversion of about 55 percent was attained After 300 hours on-stream at a constant conversion, the reaction temperature had been increased to about 762° F., therefore giving the catalyst a FR value of less than 0.02° F./hr. The feed was denitrified to the point that, after the first 100 hours on stream, the 650° F. plus portion of the product contained 0.31 p.p.m. nitrogen and only 0.27 p.p.m. at the end of about 300 hours. The pressure was then reduced to 1200 p.s.i.g. and the temperature increased to about 770° F., thereby increasing conversion to about 58 percent. After about 200 additional hours on stream, the catalyst temperature had only been increased to about 774° F. in order to maintain constant conversion, giving rise to a FR of less than 0.02° F./hr. The nitrogen level in the 650° F. plus portion of the product (the portion of the product which contains practically all of the nitrogen compounds) varied from 0.32 p.p.m. to 0.58 p.p.m. The pressure was then reduced to 800 p.s.i.g., and, with the temperature at about 774° F., conversion was about 54 percent. A constant conversion could not be maintained, even with a sharp temperature increase, so that at the end of about 80 hours, conversion had dropped from 54 to about 38 percent even though the temperature had been raised to about 840° F., therefore giving rise to a FR greater than 0.85° F./hr. The pressure was then increased to 2800 p.s.i.g. and the reaction temperature to about 850° F. Conversion immediately increased to 61 percent. The temperature was rapidly reduced (in about 2 hours) to about 810° F., at which point conversion was 59 percent. The temperature was then gradually reduced in about 80 hours from 810° F. to about 805° F., but the conversion increased from 59 percent to 71 percent during this last 80 hour period.

The data presented in Examples 9 through 12 clearly show that the catalysts of the present invention are both excellent hydrocracking and denitrification catalysts. These data also indicate the low fouling rates attainable with these catalysts, particularly within the preferred total pressure range of from about 1200 to 2000 p.s.i.g.

Example 13

Catalyst H was produced in the same manner as catalyst A of Example 1 except the components were as follows:

| | |
|---|---|
| $AlCl_3 \cdot 6H_2O$, g. | 724 |
| $NiCl_2 \cdot 6H_2O$, g. | 73.5 |
| $MoCl_5$, g. | 59.5 |
| $SiO_4(C_2H_5)_4$, g. | 208.3 |
| $CH_3OH$, ml. | 9000 |
| $H_2O$, ml. | 1200 |
| Propylene oxide, ml. | 2500 |

After sulfiding the molybdenum and nickel components, catalyst H had a composition in weight percent, of 10.1 percent NiS (6.3 percent nickel), 12.6 percent $MoS_2$ (7.6 percent molybdenum), 55.6 percent $Al_2O_3$ and 21.7 percent $SiO_2$. The alumina to silica weight ratio was 2.56. Its surface area was 408 m.²/g., its constant conditions activity was 63 percent conversion, and the middle distillate to gasoline ratio of the product was 1.3. If this catalyst were plotted on FIGURE 1, it would fall just about on the cure. Catalyst H is plotted on FIGURE 2, and is consistent with the data previously shown.

Example 14

Catalyst I was produced in the same manner as described in Example 1 except the components were as follows:

| | |
|---|---|
| $AlCl_3 \cdot 6H_2O$, g. | 725 |
| $NiCl_2 \cdot 6H_2O$, g. | 73.5 |
| $MoCl_5$ g. | 150 |
| $SiO_4(C_2H_5)_4$, g. | 208.3 |
| $CH_3OH$, ml. | 9000 |
| $H_2O$, ml. | 1200 |
| Propylene oxide, ml. | 3000 |

After sulfiding, catalyst I had a composition, again in weight percent, of 8.5 percent NiS (5.5 percent nickel), 26.7 percent $MoS_2$ (16 percent molybdenum), 46.6 percent alumina, and 18.2 percent silica. The alumina to silica weight ratio was 2.56. The catalyst had a surface area of 299 m.²/g., a constant conditions activity of 65 percent, and the product distillate to gasoline ratio of 1.2. This catalyst would also be consistent with the catalysts plotted on FIGURE 1, and is shown to be the same on FIGURE 2.

Example 15

Catalyst J was produced in the manner of Example I except the components were as follows:

| | |
|---|---|
| $AlCl_3 \cdot 6H_2O$, g. | 725 |
| $NiCl_2 \cdot 6H_2O$, g. | 147 |
| $MoCl_5$, g. | 59.5 |
| $SiO_4(C_2H_5)_4$, g. | 208.4 |
| $CH_5OH$, ml. | 4000 |
| $H_2O$, ml. | 250 |
| Propylene oxide, ml. | 1600 |

After sulfiding, catalyst J had a composition (in weight percent) of 18.4 percent NiS (11.5 percent nickel), 11.5 percent MoS (6.9 percent molybdenum), 50.4 percent alumina, and 19.7 percent silica. The alumina to silica weight ratio was 2.56. The catalyst had a surface area of 237 m.²/g., a constant conditions activity of 56 percent conversion, and the middle distillate to gasoline ratio of the product was 1.2. Again, catalyst J would be consistent with the catalysts plotted on FIGURE 1 and is consistent with the data shown on FIGURE 2.

Example 16

Catalyst K was made in the following manner:

An alumina sol was produced by dissolving 242 grams of $AlCl_3 \cdot 6H_2O$ in 1000 ml. of water and the resulting solution heated to 60° C. To this solution was slowly added 135 grams of aluminum powder. The mixture was stirred and as the temperature increased to 90° C., water was slowly added. The resulting alumina sol had a total volume of 1400 ml. and contained 18 percent alumina.

283.3 grams of the alumina sol were dissolved in 1250 ml. of methyl alcohol. To this was added 21.9 grams of $MoCl_5$, 5.04 grams of $NiCl_2 \cdot 6H_2O$, 69.45 grams of $SiO_4(C_2H_5)_4$, and 140 ml. of propylene oxide. The resulting hydrogel was allowed to stand overnight and then dehydrated by oven drying at 250° F. for 24 hours, heating in air for 4 hours at 450° F. and thereafter heating in air for 4 hours at 1000° F. The resulting gel was then contacted with hydrogen and thereafter sulfided in the manner described in Example 1.

The finished catalyst had a composition, in weight percent, of 14.1 percent $MoS_2$, 2.4 percent NiS, 60.0 percent alumina, and 23.5 percent silica. The alumina to silica weight ratio was 2.5. The catalyst had a constant conditions activity of 60 percent, and the hydrocracked products had a middle distillate to gasoline ratio of 1.3. Catalyst K would be consistent with the catalysts plotted on FIGURE 1 and is plotted on FIGURE 2.

From the above examples, it can also be seen that wide ranges of hydrogenating metal compound levels are entirely suitable for the catalysts of the present invention. It can also be seen that, with the particular straight-run gas oil feeds employed to show the efficacy of these catalysts, the higher metal level catalysts do not particularly enhance either the hydrocracking or denitrification activities of the catalysts. Thus, for use with feedstocks of the type shown in the examples, preferred Group VI metal levels (present as the sulfides) will be from about 4 to 10 weight percent metal. If Group VIII metals or metal sulfides are also present, the preferred ranges are from about 1 to 10 weight percent, again based on the metal. However, as has been pointed out above, high boiling, high nitrogen-content (2000–5000 p.p.m. or more) feeds, such as deasphalted oils, reduced crudes and the like, can also be effectively converted according to the present process. With such feeds, it has been found that somewhat higher hydrogenating metal levels are desirable, particularly from a denitrification and regeneration standpoint. Therefore, when converting such heavy feeds, the preferred Group VI metal content is from about 10 to 20 weight percent, based on the metal, and if a Group VIII component is desired, its content preferably lies in the range of from about 4 to 16 weight percent of the entire catalyst, also based on the metal.

It has been previously noted that the particular catalysts of the present invention are superior to conventionally produced catalyst, e.g., impregnation of a Group VI metal on a coprecipitated or cogelled silica-alumina support. The following examples (Examples 16 and 17) inserted for comparative purposes only, graphically show the inferiority of such conventional catalysts.

Example 17

Comparative catalyst L was made in the following manner:

2.44 grams of $PdCl_2$ were dissolved in 11 ml. of HCl and diluted with water to a total of 103 ml. Two hundred fifty ml. (85.3 g.) of a commercial silica-alumina cracking catalyst were then impregnated with the $PdCl_2$ solution. The impregnated silica-alumina support was allowed to set for one hour, was then sequentially oven dried at 400° F. for 9 hours and 900° F. for 4 hours.

34 ml. of a 20 percent ammonium molybdate solution was diluted with water to form 100 ml. of solution, containing 8.5 grams of molybdenum. The palladium impregnated support was then in turn impregnated by contact with the molybdenum-containing solution. The dual impregnated support was then sequentially heated (with dry air) for 2 hours at 250° F., 2 hours at 450° F., and 2 hours at 1000° F.

The resulting catalyst was then contacted with hydrogen for one hour at 800° F. and then sulfided by contact with a 1 to 1 mixture of hydrogen and $H_2S$ for one hour at 600° F. The resulting catalyst had a composition, in weight percent of 14 percent $MoS_2$ (8.5 percent Mo), 1.5 percent palladium, 20 percent alumina, and 64.5 percent silica. The alumina to silica weight ratio was 0.31. The surface area was 194 $m.^2/g.$ and the constant conditions activity was only 16 percent after the 8 hour run and was even less after another additional hour of on-stream time. The middle distillate to gasoline ratio of the products was 1.6. Denitrification was poor in that 142 p.p.m. of nitrogen was present in the hydrocracked total product.

Example 18

Comparative catalyst M was made in a manner quite similar to comparative catalyst L described in Example 17, i.e., another commercial silica-alumina cracking catalyst was impregnated with both palladium and molybdenum. The finished catalyst had a composition, in weight percent, of 13.3 percent $CoS_2$ (8.3 percent Mo), 1.5 percent Pd, 11 percent $Al_2O_3$, and 74.2 percent $SiO_2$. The alumina to silica weight ratio was 0.15. The catalyst had a surface area of 214 $m.^2/g.$ and a constant conditions activity of only 20 percent. Again, denitrification was poor since the total hydrocracked product contained 32 p.p.m. nitrogen.

The inferiority of comparative catalysts L and M, especially with respect to hydrocracking and denitrification activities, is clearly shown, despite the fact that the hydrogenating component levels were commensurate to exemplified catalysts of the present invention.

Although only specific modes of operating the hydrocracking process of the present invention, and only specific catalysts and methods of their manufacture have been described, numerous variations in the operation of the process and the catalysts could be made without departing from the spirit of the invention, and all such variations that fall within the scope of the appended claims are intended to be embraced thereby.

I claim:

1. A process for the single-stage denitrification and hydrocracking of hydrocarbon feedstocks containing more than about 550 p.p.m. of nitrogen and boiling in the range from about 400° to about 1400° F. to produce at least one product fraction boiling below the initial boiling point of said feedstock, which comprises contacting said feedstock, along with *at least* [from] 500 [to 2000] standard cubic feet per barrel of added hydrogen, in a hydrocracking zone at a temperature of from about 650° to about 950° F., a pressure of from about 800 to about 3000 p.s.i.g. and an L.H.S.V. of from about 0.1 to about 10.0 with a nitrogen-insensitive catalyst comprising at least one Group VI metal sulfide within a silica-alumina gel, said catalyst manufactured by the steps comprising:

(a) forming a mixture comprising a silica sol, at least one soluble aluminum compound, and at least one soluble compound of a Group VI metal;

(b) reacting said mixture formed in step (a) with a quantity of an epoxy compound sufficient to convert said mixture into a hydrogel;

(c) dehydrating said hydrogel to produce a gel comprising silica, alumina and at least one Group VI metal oxide; and (d) converting said Group VI metal to its corresponding sulfide by contact with a sulfur-containing fluid.

2. The process of claim 1 wherein said epoxy compound is an oxirane containing from 2 to 3 carbon atoms per molecule.

3. The process of claim 1 wherein the hydrocracking process is conducted at a temperature of from about 700° to about 850° F.

4. The process of claim 3 wherein the hydrocracking process is conducted at a pressure of from about 1200 to about 2000 p.s.i.g.

5. The process of claim 4 wherein said Group VI metal is molybdenum.

6. A process for the single-stage denitrification and hydrocracking of hydrocarbon feedstocks containing more than about 550 p.p.m. of nitrogen and boiling in the range from about 600° to 1200° F. to produce at least one product fraction boiling below the initial boiling point of said feedstock, which consists essentially in contacting said feedstock, along with [from about 750 to 2000] *at least 500* standard cubic feet per barrel of added hydrogen, in a hydrocracking zone at a temperature of from about 650° to about 950° F., a pressure of from about 1200 to about 2000 p.s.i.g., and an L.H.S.V. of from about 0.1 to about 10.0 with a catalyst comprising about 4 to 10 weight percent of at least one Group VI metal in the form of sulfide and about 1 to 10 weight percent of at least one Group VIII metal component within a silica-alumina gel, said catalyst manufactured by the steps comprising:

(a) forming a mixture comprising a silica sol, at least one soluble aluminum compound, at least one soluble compound of a Group VI metal, and at least one soluble compound of a Group VIII metal;

(b) reacting said mixture formed in step (a) with a quantity of an oxirane containing from 2 to 3 carbon atoms per molecule sufficient to convert said mixture into a hydrogel;

(c) dehydrating said hydrogel to produce a gel comprising silica, alumina, at least one Group VI metal oxide, and at least one Group VIII metal oxide; and (d) converting said Group VI metal to its corresponding sulfide by contact with a sulfur-containing fluid.

7. The process of claim 6 wherein the hydrocracking process is conducted at a temperature of from about 700° to about 850° F.

8. The process of claim 7 wherein said Group VI metal is molybdenum.

9. The process of claim 7 wherein said Group VIII metal is nickel.

10. The process of claim 8 wherein said Group VIII metal is palladium.

11. A process according to claim 1 for the single-stage denitrification and hydrocracking of a nitrogen-containing hydrocarbon feedstock in the presence of a nitrogen-insensitive catalyst, which process comprises the further improvement of adjusting the middle distillate to gasoline ratio of the hydrocracking zone without appreciable alteration of the process temperature and pressure, said improvement consisting essentially in employing a catalyst having a weight ratio of alumina to silica of below about 1.6 when the ratio of middle distillate to gasoline product below about 1.0 is desired, and employing a catalyst having a weight ratio of alumina to silica above about 1.6 when the ratio of middle distillate to gasoline product above about 1.0 is desired.

References Cited

The following references, cited by the Examiner, are of record in the patented file of this patent or the original patent.

UNITED STATES PATENTS

| | | | |
|---|---|---|---|
| 2,317,803 | 4/1943 | Reeves et al. | 208—120 |
| 2,348,647 | 5/1944 | Reeves et al. | 208—120 |
| 2,356,576 | 8/1944 | Free et al. | 208—110 |
| 2,944,005 | 7/1960 | Scott | 208—109 |

OTHER REFERENCES

"Advances in Hydrocracking," by Voorhies et al., p. 171, vol. VIII, Advances in Petroleum Chemistry and Refining, Interscience Publishers, New York (1964).

"Conversion of Petroleum," by Sachanen, pp. 314 to 319, 2nd edition, Reinhold Pub. Corp., New York, 1948.

ABRAHAM RIMENS, *Primary Examiner.*